US012476340B2

(12) United States Patent
Song et al.

(10) Patent No.: US 12,476,340 B2
(45) Date of Patent: Nov. 18, 2025

(54) TUNING STRUCTURE AND ELECTRONIC DEVICE WITH IMPROVED TUNING EFFICIENCY

(71) Applicant: Suzhou Luxshare Technology Co., Ltd., Suzhou (CN)

(72) Inventors: Zhenguo Song, Suzhou (CN); Guiping Gao, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 307 days.

(21) Appl. No.: 18/371,061

(22) Filed: Sep. 21, 2023

(65) Prior Publication Data

US 2024/0405401 A1 Dec. 5, 2024

(30) Foreign Application Priority Data

May 31, 2023 (CN) ......................... 202310636227.4

(51) Int. Cl.
*H01P 1/20* (2006.01)
*H01P 1/207* (2006.01)
*H01P 7/00* (2006.01)

(52) U.S. Cl.
CPC ................ *H01P 1/207* (2013.01); *H01P 1/20* (2013.01); *H01P 7/00* (2013.01)

(58) Field of Classification Search
CPC .. H01P 1/207; H01P 1/20; H01P 1/201; H01P 1/202; H01P 1/205; H01P 1/2053; H01P 1/208; H01P 7/00; H01P 7/04; H01P 7/06
See application file for complete search history.

(56) References Cited

FOREIGN PATENT DOCUMENTS

| | | | | | |
|---|---|---|---|---|---|
| CN | 205863354 | U | | 1/2017 | |
| CN | 212257636 | U | | 12/2020 | |
| CN | 112751149 | B | | 2/2022 | |
| CN | 114914649 | A | * | 8/2022 | .............. H01P 1/207 |
| KR | 10-20230018561 | A | | 2/2023 | |

* cited by examiner

*Primary Examiner* — Stephen E. Jones
(74) *Attorney, Agent, or Firm* — Birch, Stewart, Kolasch & Birch, LLP

(57) ABSTRACT

A tuning structure for locking or releasing a tuning rod includes a cover plate, an adjustment member and an elastic element. The cover plate has a mounting hole. The adjustment member is rotatably engaged with a hole wall in the mounting hole. A first through hole is provided at a center of the adjustment member. The tuning rod passes through the mounting hole and the first through hole. The elastic element is disposed in the mounting hole. The tuning rod passes through the elastic element. One end of the elastic element abuts against the regulating member, and the other end of the elastic element abuts against the hole wall. By rotating the adjustment member, the elastic element can lock or release to the tuning rod. The present disclosure also discloses an electronic device having the tuning structure.

18 Claims, 7 Drawing Sheets

TUNING STRUCTURE AND ELECTRONIC DEVICE WITH IMPROVED TUNING EFFICIENCY

CROSS-REFERENCE TO RELATED APPLICATION

This patent application claims priority of a Chinese Patent Application No. 202310636227.4, filed on May 31, 2023 and titled "TUNING STRUCTURE AND ELECTRONIC DEVICE", the entire content of which is incorporated herein by reference.

TECHNICAL FIELD

The present disclosure relates to a field of electronic equipment, in particular to a tuning structure and an electronic device.

BACKGROUND

A filter is a key equipment in a mobile communication system, and a cavity filter is a microwave filter with a resonant cavity structure. A cavity can be equivalent to an inductor connected in parallel with a capacitor to form a resonant stage so as to realize the microwave filtering function. The cavity filter needs manual debugging to achieve the design performance index.

Most of the debugging rods in the existing cavity filters are screw rods with threads. The screw rod cooperates with a nut arranged on the cavity. The screw rod and the nut are screwed together manually, and the design performance index is achieved by adjusting the height of the screw.

However, debris is likely to be generated during the screwing process of the screw rod and the nut, and the tuning takes a long time and costs a lot.

Therefore, it is necessary to provide a tuning structure and an electronic device to solve the above problems.

SUMMARY

An object of the present disclosure is to provide anew tuning structure and an electronic device, which can reduce tuning time and improve tuning efficiency.

In order to achieve the above object, the present disclosure adopts the following technical solution: a tuning structure for locking or releasing a tuning rod, including: a cover plate defining a mounting hole and a hole wall enclosing the mounting hole; an adjustment member rotatably engaged with the hole wall; a first through hole being provided at a center of the adjustment member; the tuning rod being configured to pass through the mounting hole and the first through hole; and an elastic element disposed in the mounting hole; the tuning rod passing through the elastic element; one end of the elastic element abutting against the adjustment member, and another end of the elastic element abutting against the hole wall; wherein by rotating the adjustment member, the elastic element is capable of locking or releasing the tuning rod.

In order to achieve the above object, the present disclosure adopts the following technical solution: an electronic device, including: a tuning structure; and a tuning rod passing through the tuning structure; the tuning structure being configured for locking or releasing the tuning rod, the tuning structure including: a cover plate defining a mounting hole and a hole wall enclosing the mounting hole; an adjustment member rotatably engaged with the hole wall; a first through hole being provided at a center of the adjustment member; the tuning rod being configured to pass through the mounting hole and the first through hole; and an elastic element disposed in the mounting hole; the tuning rod passing through the elastic element; one end of the elastic element abutting against the adjustment member, and another end of the elastic element abutting against the hole wall; wherein by rotating the adjustment member, the elastic element is capable of locking or releasing the tuning rod.

Compared with the prior art, the present disclosure has the following beneficial effects: the present application discloses an electronic device and a tuning structure which is used to lock or release the tuning rod. The tuning structure includes the cover plate, the adjustment member and the elastic element. The cover plate has the mounting hole, and the adjustment member is rotatably engaged with the hole wall in the mounting hole. The elastic element is disposed in the mounting hole. The tuning rod passes through the elastic element. Besides, one end of the elastic element abuts against the adjustment member, and another end of the elastic element abuts against the hole wall. By rotating the adjustment member, the elastic element is able to lock or release the tuning rod, so that the tuning rod can directly move up and down in the tuning structure, thereby saving tuning time and improving tuning efficiency.

DETAILED DESCRIPTION

Figure 1:
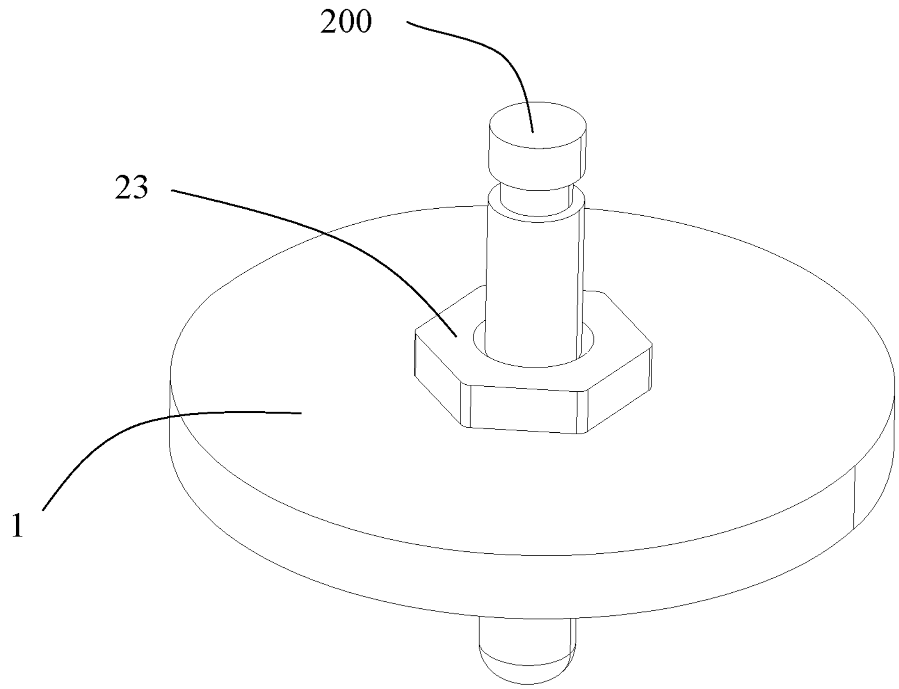
FIG. 1 is a perspective schematic view of a tuning rod and a tuning structure disclosed in an embodiment of the present disclosure.
Figure 2:
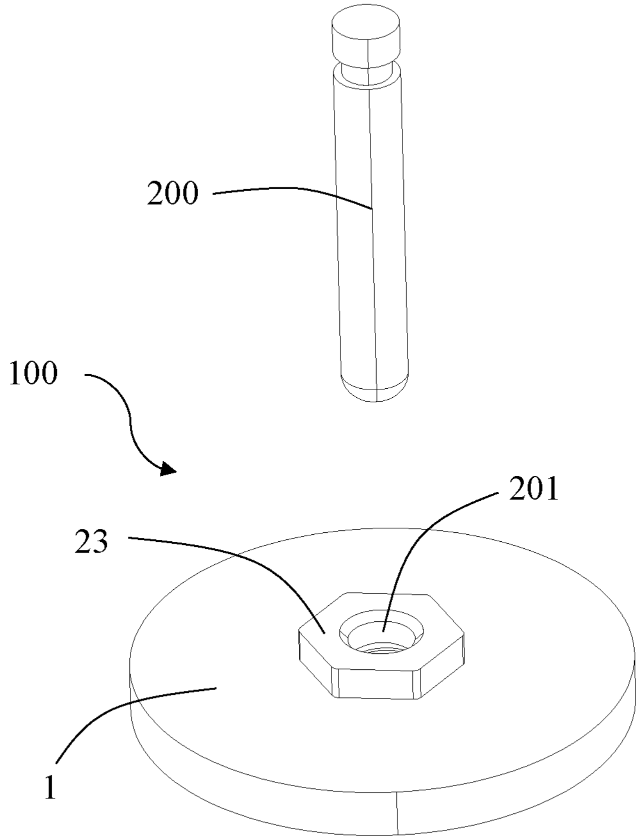
FIG. 2 is a perspective exploded schematic view of FIG. 1.
Figure 3:
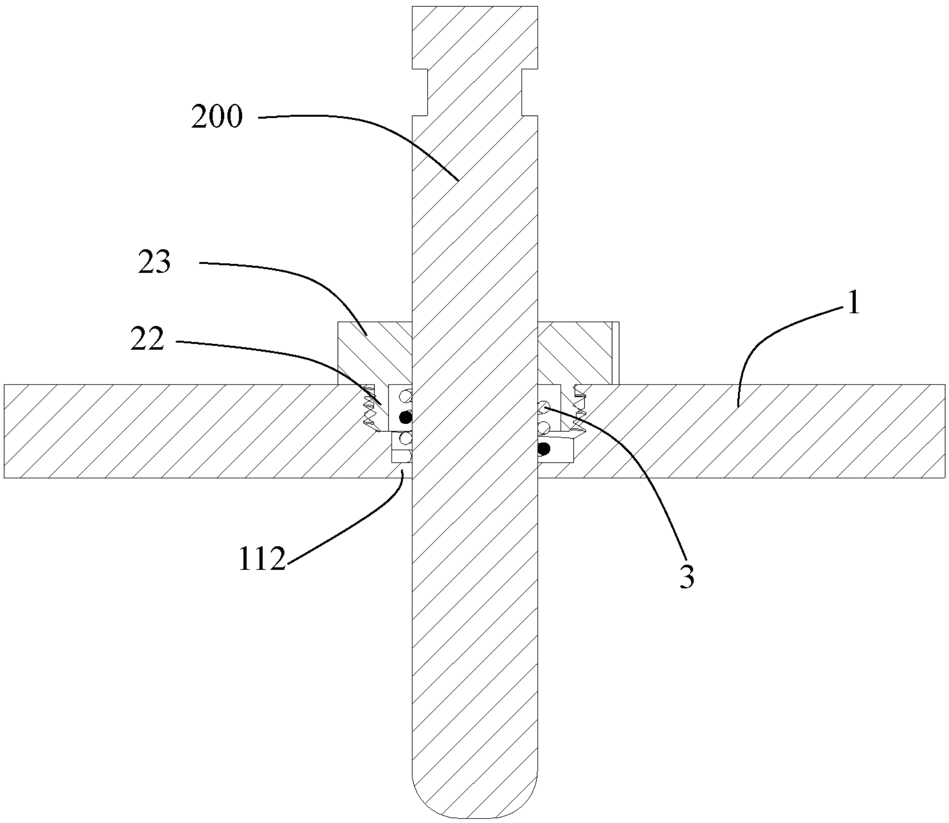
FIG. 3 is a schematic cross-sectional view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 7, the present disclosure discloses an electronic device including a tuning structure 100 and a tuning rod 200. The tuning rod 200 passes through the tuning structure 100. The tuning structure 100 is capable of locking or releasing the tuning rod 200. In the embodiments of the present application, the electronic device is used in radio frequency products, including but not limited to a filter, a duplexer, a combiner, a tower top amplifier, etc., which is not limited here. In the embodiment of the present disclosure, the tuning rod 200 is of a cylindrical configuration. Compared with a common screw, the tuning rod 200 does not have a threaded structure on its cylindrical wall. Therefore, when the tuning rod 200 is screwed together with the tuning structure 100, no metal debris is generated, thereby improving the intermodulation and insertion loss of the electronic device.

Referring to FIG. 1 to FIG. 7, the present application discloses the tuning structure 100 used for locking or releasing the tuning rod 200. Specifically, the tuning structure 100 includes a cover plate 1, an adjustment member 2 and an elastic element 3. Specifically, the electronic device has a cavity. Atop of the cavity is covered with the cover plate 1. The cover plate 1 has a mounting hole 101 communicating with the cavity and a hole wall 11 enclosing the mounting hole 101. The adjustment member 2 is rotatably engaged with a hole wall 11 in the mounting hole 101. A first through hole 201 is formed in a center of the adjustment member 2. The tuning rod 200 is capable of passing through the mounting hole 101 and the first through hole 201. The elastic element 3 is disposed in the mounting hole 101. The tuning rod 200 passes through the elastic element 3. One end of the elastic element 3 abuts against the adjustment member 2, and another end of the elastic element 3 abuts against the hole wall 11 in the mounting hole 101. By rotating the adjustment member 2, the elastic element 3 is able to lock or release the tuning rod 200. When the adjustment member 2 is turned counterclockwise and the elastic element 3 locks the tuning rod 200, the tuning rod 200 is in a fixed state in the cavity. When the electronic device needs to be tuned, the adjustment member 2 is rotated so that the elastic element 3 releases the tuning rod 200. By quickly adjusting a length of the tuning rod 200 entering the cavity, the quick debugging of the electronic device can be completed; and then rotate the adjustment member 2 clockwise to position the tuning rod 200 in the cavity.

Referring to FIG. 2 to FIG. 5, the adjustment member 2 has a first fixing portion 21. The hole wall 11 has a second fixing portion 111. The one end of the elastic element 3 abuts against the first fixing portion 21, and the another end of the elastic element 3 abuts against the second fixing portion 111. When the adjustment member 2 is rotated, a diameter of the elastic element 3 is capable of being contracted or expanded so as to lock or release the tuning rod 200.

Figure 4:
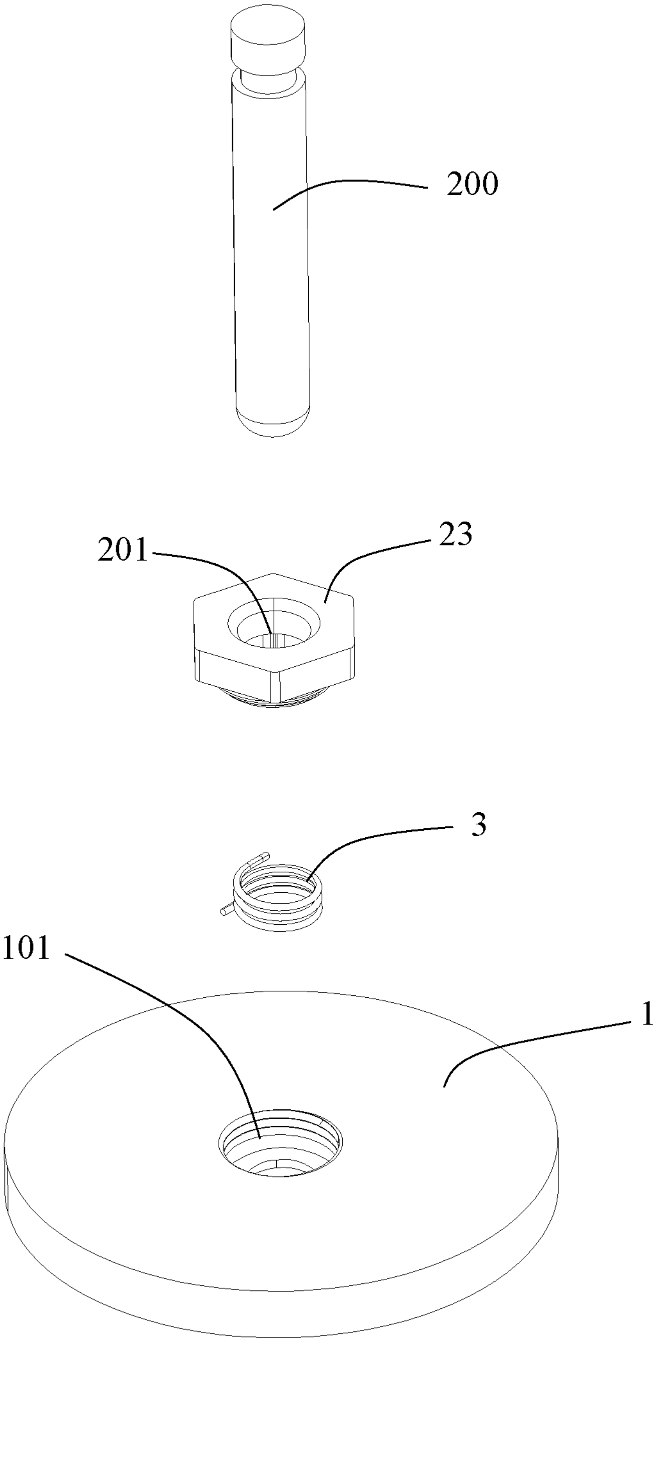
FIG. 4 is a perspective exploded schematic view of FIG. 1.
Figure 5:
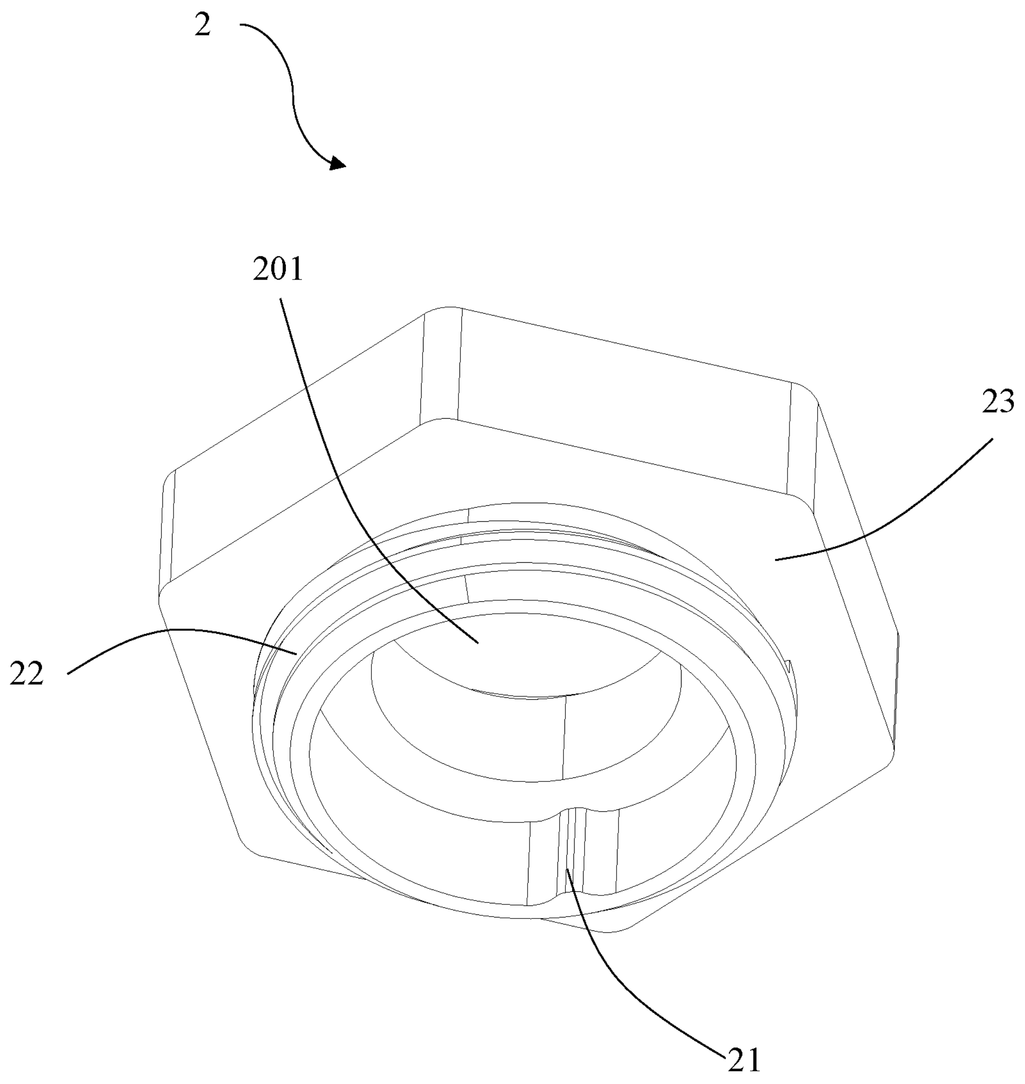
FIG. 5 is a perspective schematic view of an adjustment member in FIG. 1.

Referring to FIG. 4 to FIG. 5, specifically, the adjustment member 2 includes an annular portion 22. The first through hole 201 is located at a center of the annular portion 22. An outer wall of the annular portion 22 is screwed to the hole wall 11. The first fixing portion 21 is disposed on an inner wall of the annular portion 22. At least part of the elastic element 3 is located in the annular portion 22 and is arranged around the inner wall of the annular portion 22. The first fixing portion 21 is a protruding structure or a groove structure. In the embodiment of the present application, the first fixing portion 21 is the protruding structure. The first fixing portion 21 protrudes toward the center of the annular portion 22. One free end of the elastic element 3 elastically abuts against the first fixing portion 21. When the adjustment member 2 rotates in the mounting hole 101, the first fixing member 21 is able to prevent the elastic element 3 from rotating. At the same time, the annular portion 22 of the adjustment member 2 can exert pressure on the one free end of the elastic element 3, so that the diameter of the elastic element 3 expands after being compressed, so as to relax the tuning rod 200. In other embodiments, the first fixing portion 21 is the groove structure, and the one free end of the elastic element 3 is inserted into the groove structure.

Referring to FIG. 4 to FIG. 5, the adjustment member 2 further includes an adjustment portion 23. The adjustment portion 23 is disposed on a side of the annular portion 22 away from the cover plate 1. The first through hole 201 passes through centers of the annular portion 22 and the adjustment portion 23, so that the tuning rod 200 can pass through the adjustment portion 23 and the annular portion 22. The first through hole 201 has two sections. A first section of the first through hole 201 is located in the adjustment portion 23. A second section of the first through hole 201 is located in the annular portion 22. A diameter of the first through hole 201 located in the adjustment portion 23 is smaller than that located in the annular portion 22, so that at least part of the elastic element 3 is accommodated in the annular portion 22 and abuts against the first fixing portion 21. An annular gap is formed between the annular portion 22 and the tuning rod 200 along a radial direction. At least part of the elastic element 3 is arranged in the annular gap. One end of the tuning rod 200 can pass through the first through hole 201, the elastic element 3 and the mounting hole 101. When the tuning rod 200 passes through the first through hole 201, the tuning rod 200 passes through the elastic element 3 at the same time. When the adjustment member 2 is rotated, the diameter of the elastic element 3 can be contracted or expanded to lock or release the tuning rod 200.

An outer diameter of the annular portion 22 is smaller than an outer diameter of the adjustment portion 23. When the annular portion 22 is screwed into the mounting hole 101, at least part of the adjustment portion 23 can abut against the cover plate 1 so as to restrict the screwing position of the adjustment member 2 in the mounting hole 101. Optionally, an edge profile of the adjustment portion 23 is of a hexagonal configuration, so as to be compatible with conventional tools. As a result, it is convenient for the debugging personnel to use tools to rotate the adjustment portion 23, so as to adjust the tightness of the tuning rod 200.

In the embodiment of the present disclosure, the diameter of the first through hole 201 located in the adjustment portion 23 is adapted to the diameter of the tuning rod 200. The diameter of the first through hole 201 located in the adjustment portion 23 is the diameter of the first section.

When the tuning rod 200 passes through the first section of the first through hole 201, a peripheral wall of the tuning rod 200 abuts against the first section, which prevents the tuning rod 200 from shaking in the first end, thereby improving the stability of the tuning rod 200.

Referring to FIG. 3, FIG. 4, FIG. 6 and FIG. 7, the hole wall 11 of the mounting hole 101 is further provided with a hollow ring portion 112. The elastic element 3 is disposed between the ring portion 112 and the annular portion 22. Specifically, the ring portion 112 is disposed at the bottom of the hole wall 11. The second fixing portion 111 is disposed between the ring portion 112 and the hole wall 11. The second fixing portion 111 is a protruding structure or a groove structure. In the embodiment of the present application, the second fixing portion 111 is the protruding structure. The second fixing portion 111 protrudes toward a center of the mounting hole 101. The other free end of the elastic element 3 elastically abuts against the second fixing portion 111. When the adjustment member 2 is screwed counterclockwise into the mounting hole 101, the second fixing portion 111 can prevent the elastic element 3 from rotating. Besides, the ring portion 112 supports the other end of the elastic element 3, so that the diameter of the elastic element 3 expands after being compressed, so as to release the tuning rod 200. In other embodiments, the second fixing portion 111 is the groove structure. The other free end of the elastic element 3 is inserted into the groove structure.

Figure 6:
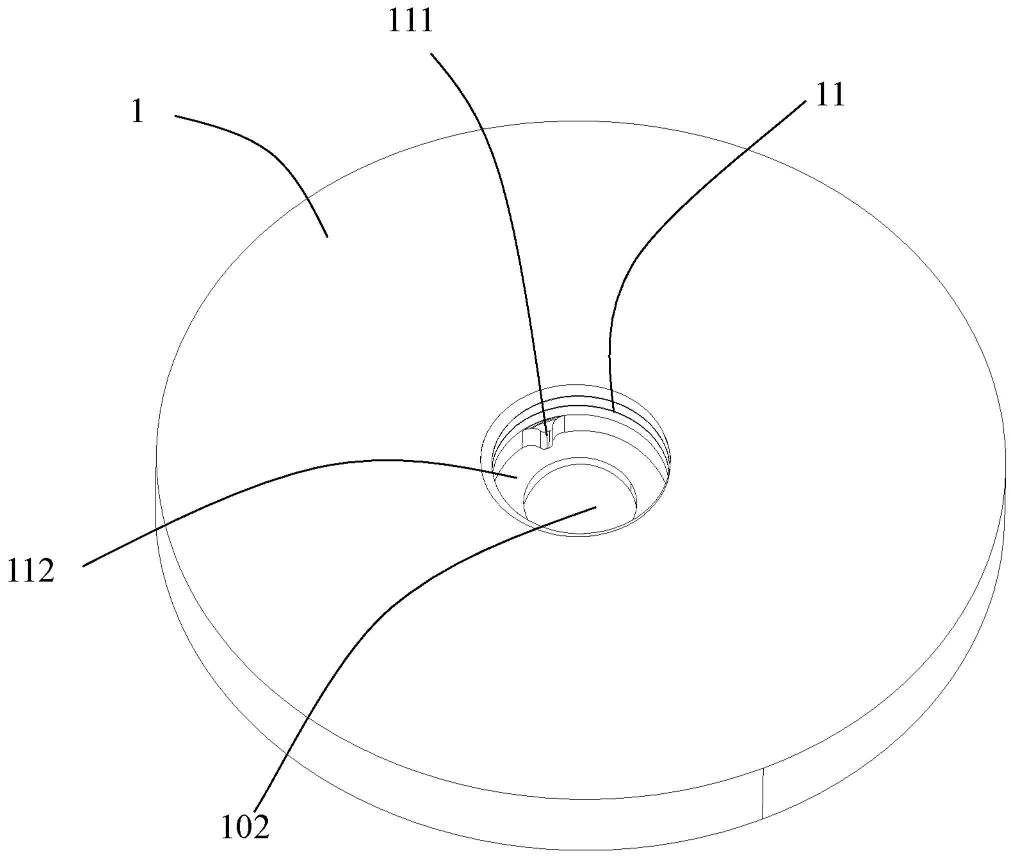
FIG. 6 is a schematic perspective view of a cover plate in FIG. 1.
Figure 7:
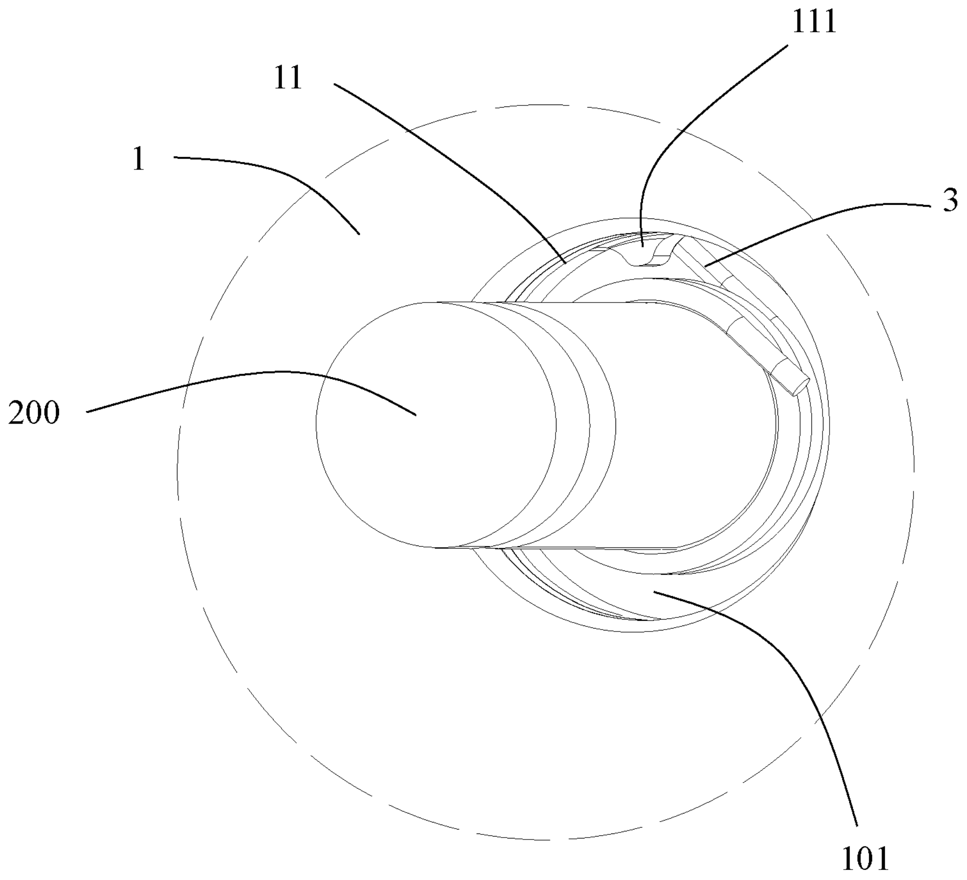
FIG. 7 is a partial perspective view of the cover plate, an elastic element and the tuning rod in FIG. 1 in an assembled state.

Referring to FIG. 6, a center of the ring portion 112 has a second through hole 102 communicating with the mounting hole 101. As a result, the tuning rod 200 can pass through the first through hole 201, the mounting hole 101, and the second through hole 102 in sequence and then enter into the cavity. The diameter of the second through hole 102 is smaller than the diameter of the mounting hole 101. At least part of the elastic element 3 is located in the mounting hole 101. The other end of the elastic element 3 abuts against the ring portion 112. The ring portion 112 can support the other end of the elastic element 3. The second through hole 102, the mounting hole 101 and the first through hole 201 are arranged concentrically, and the diameter of the second through hole 102 is the same as that of the first through hole 201, so that the tuning rod 200 can smoothly move among the second through hole 102, the mounting hole 101 and the first through hole 201, and the tuning rod 200 will not shake.

Referring to FIG. 4, in the embodiment of the present application, the elastic element 3 is a coil spring. The tuning rod 200 passes through an axis of the coil spring. The tuning rod 200 is in interference fit with the coil spring, so that the coil spring can lock the tuning rod 200. A cross section of the elastic element 3 is circular or rectangular so as to increase the friction between the elastic element 3 and the tuning rod 200, which enables the tuning rod 200 to be fixed in the mounting hole 101 through the elastic element 3, and it is not easy to move up and down.

The present disclosure further discloses a tuning method for the tuning structure 100. The tuning structure 100 is the tuning structure described above. The tuning method includes the steps of:

- rotating the adjustment portion 2 clockwise; since one end of the elastic element 3 abuts against the first fixing portion 21, and the other end of the elastic element 3 abuts against the second fixing portion 111, when the adjustment member 2 is rotated clockwise, the two ends of the elastic element 3 rotate clockwise against their own elasticity, so that the diameter of the elastic element 3 expands;
- providing the tuning rod 200, and passing the tuning rod 200 through the first through hole 201 of the adjustment member 2, the inner side of the elastic element 3 and the mounting hole 101 of the cover plate 1 until the tuning rod 200 extends into the cavity of the electronic device to a desired length;
- rotating the adjustment member 2 counterclockwise to make the diameter of the elastic element 3 contract under the action of its own elasticity until the elastic element 3 locks the tuning rod 200.

In summary, the present application discloses the electronic device and the tuning structure 100 which is used for locking or releasing the tuning rod 200. The tuning structure 100 includes the cover plate 1, the adjustment member 2 and the elastic element 3. The cover plate 1 has the mounting hole 101. The adjustment member 2 is rotatably engaged with the hole wall 11 of the mounting hole 101. The elastic element 3 is disposed in the mounting hole 101. The tuning rod 200 passes through the elastic element 3. One end of the elastic element 3 abuts against the adjustment member 2, and the other end of the elastic element 3 abuts against the hole wall 11 of the mounting hole 101. By rotating the adjustment member 2, the elastic element 3 can lock or release to the tuning rod 200, so that the tuning rod 200 can directly move up and down in the tuning structure 100, thereby saving tuning time and improving tuning efficiency.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A tuning structure for locking or releasing a tuning rod, comprising:

- a cover plate defining a mounting hole and a hole wall enclosing the mounting hole;
- an adjustment member rotatably engaged with the hole wall; a first through hole being provided at a center of the adjustment member; the tuning rod being configured to pass through the mounting hole and the first through hole; and
- an elastic element disposed in the mounting hole; the tuning rod passing through the elastic element; one end of the elastic element abutting against the adjustment member, and another end of the elastic element abutting against the hole wall;
- wherein by rotating the adjustment member, the elastic element is capable of locking or releasing the tuning rod.

2. The tuning structure according to claim 1, wherein the adjustment member has a first fixing portion; the hole wall has a second fixing portion; the one end of the elastic element abuts against the first fixing portion, and the another end of the elastic element abuts against the second fixing portion; when the adjustment member is rotated, a diameter of the elastic element is capable of being contracted or expanded so as to lock or release the tuning rod.

3. The tuning structure according to claim 2, wherein the first fixing portion is a protruding structure or a groove structure; and the second fixing portion is a protruding structure or a groove structure.

4. The tuning structure according to claim 2, wherein the adjustment member comprises an annular portion; the first through hole is located at a center of the annular portion; an outer wall of the annular portion is screwed to the hole wall; the first fixing portion is disposed on an inner wall of the annular portion; at least part of the elastic element is located in the annular portion and disposed around the inner wall of the annular portion.

5. The tuning structure according to claim 4, wherein the adjustment member further comprises an adjustment portion which is disposed on a side of the annular portion away from the cover plate; the first through hole has two sections; a diameter of the first through hole located in the adjustment portion is smaller than that located in the annular portion; an annular gap is formed between the annular portion and the tuning rod along a radial direction; at least part of the elastic element is disposed in the annular gap; one end of the tuning rod is configured to pass through the first through hole, the elastic element and the mounting hole.

6. The tuning structure according to claim 5, wherein the diameter of the first through hole located in the adjustment portion is adapted to a diameter of the tuning rod.

7. The tuning structure according to claim 4, wherein the hole wall of the mounting hole further comprises a hollow ring portion; and the elastic element is disposed between the ring portion and the annular portion.

8. The tuning structure according to claim 7, wherein an inner side of the annular portion defines a second through hole communicating with the mounting hole; a diameter of the second through hole is smaller than a diameter of the mounting hole; the second through hole, the mounting hole and the first through hole are arranged concentrically, and the second through hole and the first through hole have a same diameter.

9. The tuning structure according to claim 1, wherein the elastic element is a coil spring, and a cross section of the elastic element is circular or rectangular.

10. An electronic device, comprising:

a tuning structure; and a tuning rod passing through the tuning structure;

the tuning structure being configured for locking or releasing the tuning rod, the tuning structure comprising:

a cover plate defining a mounting hole and a hole wall enclosing the mounting hole;

an adjustment member rotatably engaged with the hole wall; a first through hole being provided at a center of the adjustment member; the tuning rod being configured to pass through the mounting hole and the first through hole; and an elastic element disposed in the mounting hole; the tuning rod passing through the elastic element; one end of the elastic element abutting against the adjustment member, and another end of the elastic element abutting against the hole wall;

wherein by rotating the adjustment member, the elastic element is capable of locking or releasing the tuning rod.

11. The electronic device according to claim 10, wherein the adjustment member has a first fixing portion; the hole wall has a second fixing portion; the one end of the elastic element abuts against the first fixing portion, and the another end of the elastic element abuts against the second fixing portion; when the adjustment member is rotated, a diameter of the elastic element is capable of being contracted or expanded so as to lock or release the tuning rod.

12. The electronic device according to claim 11, wherein the first fixing portion is a protruding structure or a groove structure; and the second fixing portion is a protruding structure or a groove structure.

13. The electronic device according to claim 11, wherein the adjustment member comprises an annular portion; the first through hole is located at a center of the annular portion; an outer wall of the annular portion is screwed to the hole wall; the first fixing portion is disposed on an inner wall of the annular portion; at least part of the elastic element is located in the annular portion and disposed around the inner wall of the annular portion.

14. The electronic device according to claim 13, wherein the adjustment member further comprises an adjustment portion which is disposed on a side of the annular portion away from the cover plate; the first through hole has two sections; a diameter of the first through hole located in the adjustment portion is smaller than that located in the annular portion; an annular gap is formed between the annular portion and the tuning rod along a radial direction; at least part of the elastic element is disposed in the annular gap; one end of the tuning rod is configured to pass through the first through hole, the elastic element and the mounting hole.

15. The electronic device according to claim 14, wherein the diameter of the first through hole located in the adjustment portion is adapted to a diameter of the tuning rod.

16. The electronic device according to claim 13, wherein the hole wall of the mounting hole further comprises a hollow ring portion; and the elastic element is disposed between the ring portion and the annular portion.

17. The electronic device according to claim 16, wherein an inner side of the annular portion defines a second through hole communicating with the mounting hole; a diameter of the second through hole is smaller than a diameter of the mounting hole; the second through hole, the mounting hole and the first through hole are arranged concentrically, and the second through hole and the first through hole have a same diameter.

18. The electronic device according to claim 10, wherein the elastic element is a coil spring, and a cross section of the elastic element is circular or rectangular.

* * * * *